(12) United States Patent
Hong et al.

(10) Patent No.: US 7,350,814 B2
(45) Date of Patent: Apr. 1, 2008

(54) TILT-TELESCOPIC APPARATUS FOR STEERING SYSTEM

(75) Inventors: Sung-Jong Hong, Seoul (KR); Kwang-Mo Koo, Suwon-Si (KR); Jae-Uk Oh, Seoul (KR); Jae-Moon Han, Suwon-Si (KR)

(73) Assignee: Namyang Ind. Co., Ltd., Kyonggi-Do (KR)

( * ) Notice: Subject to any disclaimer, the term of this patent is extended or adjusted under 35 U.S.C. 154(b) by 439 days.

(21) Appl. No.: 11/042,203

(22) Filed: Jan. 26, 2005

(65) Prior Publication Data

US 2005/0172751 A1  Aug. 11, 2005

(30) Foreign Application Priority Data

Feb. 10, 2004  (KR)  ............... 10-2004-0008661

(51) Int. Cl.
*B62D 1/18*  (2006.01)
(52) U.S. Cl. ............................. 280/775; 74/493
(58) Field of Classification Search ............ 280/775, 280/771; 74/492, 493
See application file for complete search history.

(56) References Cited

U.S. PATENT DOCUMENTS

| 5,209,512 | A | * | 5/1993 | Hancock et al. ............ 280/775 |
|---|---|---|---|---|
| 5,361,646 | A | * | 11/1994 | Venable ..................... 74/531 |
| 5,363,716 | A | * | 11/1994 | Budzik et al. ............... 74/493 |
| 5,743,150 | A | * | 4/1998 | Fevre et al. ................. 74/493 |
| 5,820,163 | A | * | 10/1998 | Thacker et al. ............. 280/775 |
| 6,035,739 | A | * | 3/2000 | Milton ........................ 74/493 |
| 6,036,228 | A | * | 3/2000 | Olgren et al. ............... 280/775 |
| 6,189,405 | B1 | * | 2/2001 | Yazane ....................... 74/493 |
| 6,205,882 | B1 | * | 3/2001 | Jolley ......................... 74/493 |
| 6,272,945 | B1 | * | 8/2001 | Jolley ......................... 74/493 |
| 6,467,367 | B2 | * | 10/2002 | Kim et al. ................... 74/493 |
| 6,543,807 | B2 | * | 4/2003 | Fujiu et al. ................. 280/775 |
| 7,077,027 | B2 | * | 7/2006 | Krizan et al. ............... 74/493 |
| 7,127,963 | B2 | * | 10/2006 | Lee ............................. 74/493 |
| 2002/0024208 | A1 | * | 2/2002 | Fujiu et al. ................. 280/775 |
| 2002/0059847 | A1 | * | 5/2002 | Green et al. ................ 74/492 |
| 2002/0066334 | A1 | * | 6/2002 | Kim et al. ................... 74/493 |
| 2002/0139216 | A1 | * | 10/2002 | Armstrong et al. ......... 74/492 |
| 2003/0164608 | A1 | * | 9/2003 | Morita et al. ............... 280/775 |
| 2003/0217613 | A1 | * | 11/2003 | Sato et al. ................... 74/493 |
| 2004/0159173 | A1 | * | 8/2004 | Sawada ...................... 74/492 |
| 2005/0093281 | A1 | * | 5/2005 | Nishioka et al. ........... 280/775 |
| 2005/0127656 | A1 | * | 6/2005 | Sato et al. ................... 280/775 |
| 2005/0167962 | A1 | * | 8/2005 | Sato et al. ................... 280/775 |
| 2005/0217408 | A1 | * | 10/2005 | Sato et al. ................... 74/492 |
| 2006/0266152 | A1 | * | 11/2006 | Armstrong et al. ......... 74/493 |
| 2007/0068310 | A1 | * | 3/2007 | Arihara ....................... 74/493 |

FOREIGN PATENT DOCUMENTS

JP  2001347953 A  * 12/2001
JP  2002-173033  6/2002

* cited by examiner

*Primary Examiner*—Eric Culbreth
*Assistant Examiner*—Barry Gooden, Jr.
(74) *Attorney, Agent, or Firm*—Dickstein Shapiro LLP

(57) ABSTRACT

A tilt-telescopic apparatus for a steering system allows a tilt restraining means and telescopic restraining means to cooperate via one manipulating lever. A tilt restraint, telescopic restraint, tilt restraint release, and telescopic restraint release are conducive to simultaneous tilt and telescopic engagement by a single manipulation for convenience. The parts of the apparatus, including structural parts for transmitting power to the manipulating lever and the like that can be co-used, can be unified, thus resulting in simplified structure and reduction of manufacturing cost.

8 Claims, 7 Drawing Sheets

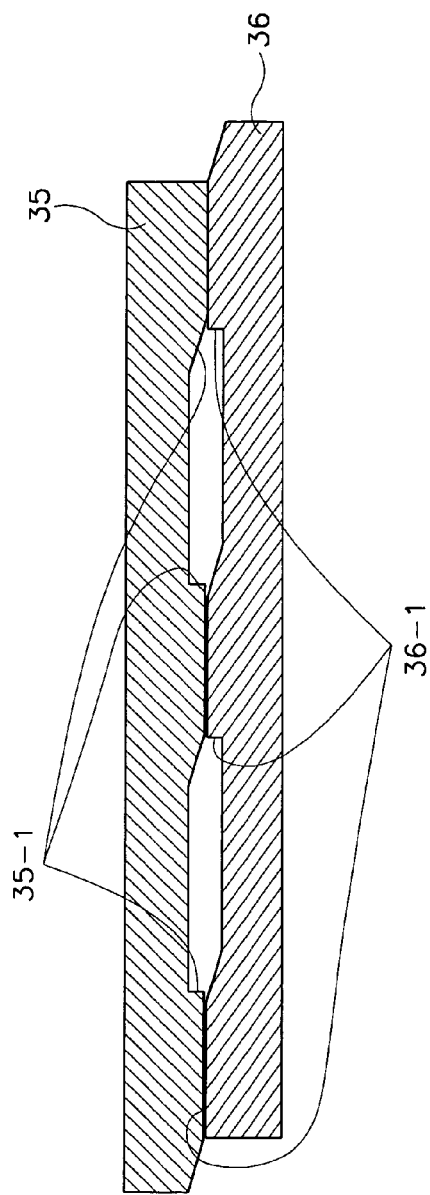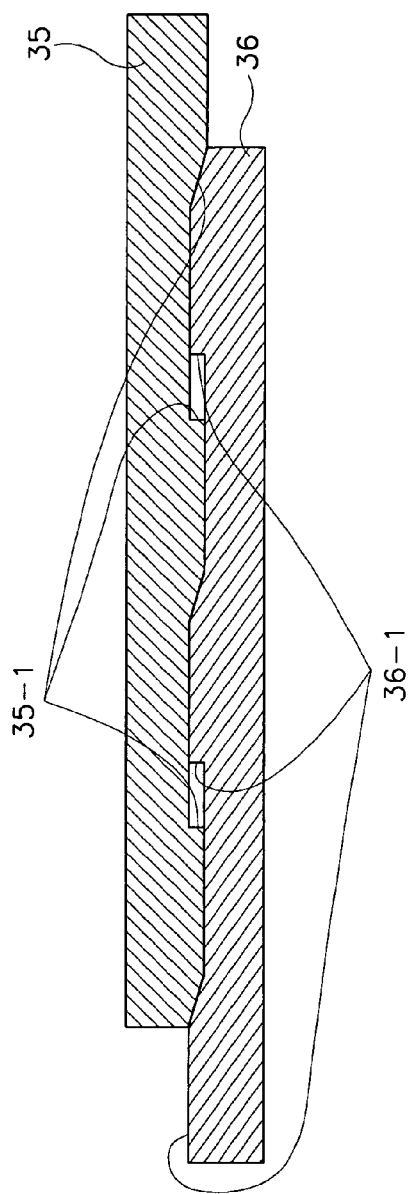

TILT-TELESCOPIC APPARATUS FOR STEERING SYSTEM

FIELD OF THE INVENTION

The present invention relates to a tilt-telescopic apparatus for a steering system and, more particularly, to a tilt-telescopic apparatus for steering systems adapted to perform the tilt and telescopic function simultaneously.

BACKGROUND OF THE INVENTION

Generally, a steering system, which is an apparatus for steering the direction of a vehicle according to a manipulation of a driver, includes a steering wheel, steering shaft, steering gear and steering linkage.

The steering wheel is an apparatus for transforming a manipulating force of a driver to a rotational movement, and the steering shaft is an apparatus for transmitting a rotational movement of a steering wheel to a steering gear. The steering gear is an apparatus for decelerating a speed of a rotational movement of a steering wheel, and simultaneously for transforming a rotational movement to a linear movement and transmitting to a linkage mechanism. The steering linkage is an apparatus for transmitting a force from a steering gear to the front wheels of vehicle.

In addition to the basic components thus described in the steering system, a variety of convenient apparatuses are provided, and the most convenient apparatus is the one for changing the position of steering wheel according to driver's form and posture.

The apparatus for changing the position of the steering wheel includes a tilt device and a telescopic deice. The tilt apparatus is an apparatus for varying angles of steering wheels to up-down directions while the telescopic apparatus is an apparatus for axially sliding a steering shaft and a steering column to elongate or shorten the total length of the steering shaft and the steering column.

However, there is a drawback in that a tilt apparatus and a telescopic apparatus are separately provided. The tilt apparatus and the telescopic apparatus have to be operated in respectively separate manners to generate inconvenience. There is another drawback in that due to the separate provision of a tilt apparatus and telescopic apparatus, the steering system is complicated in structure thereof, therefore resulting in an increase in manufacturing cost.

The present invention is provided to address the above-mentioned problems and it is an object of the present invention to provide a tilt-telescopic apparatus for a steering system configured to engage the tilt and telescopic functions simultaneously. It is another object of the present invention to provide a tilt-telescopic apparatus for a steering system that is simplified in structure.

In accordance with a preferred embodiment of the present invention, the tilt-telescopic apparatus for a steering system, which includes a main housing, an inner pipe longitudinally movable in a main housing, a column housing coupled to a distal end of the inner pipe and an upper housing rotatably hinged to a distal end of the column housing, comprises a manipulating lever rotatably hinged to a lower side of the main housing. A telescopic restraining means is formed at a distal end of the main housing and tightened by rotation of the manipulating lever to restrain the inner pipe. A cable is connected to one end of the manipulating lever and a tilt lever is connected to the other end of the cable and rotatably mounted at the upper housing. A fixation gear is mounted at an upper side or lower side of the column housing and is longitudinally formed with teeth along a curvature. A tilt restraining means includes teeth meshed with teeth of the fixation gear and rotates in cooperation with the tilt lever for separating the teeth in relation to the rotating direction by pushing the teeth toward the teeth of the fixation gear or pulling the teeth.

BRIEF DESCRIPTION OF THE DRAWINGS

For a better understanding of the nature and objects of the present invention, reference should be made to the following detailed description with the accompanying drawings, in which:

FIG. 7 is a cross-sectional view taken along a direction D1-D2 of FIG. 6 for illustrating a tightened state; and FIG. 8 is a cross-sectional view taken along a direction D1-D2 of FIG. 6 for illustrating an unwound state.

DETAILED DESCRIPTION OF THE PREFERRED EMBODIMENT

Figure 1:
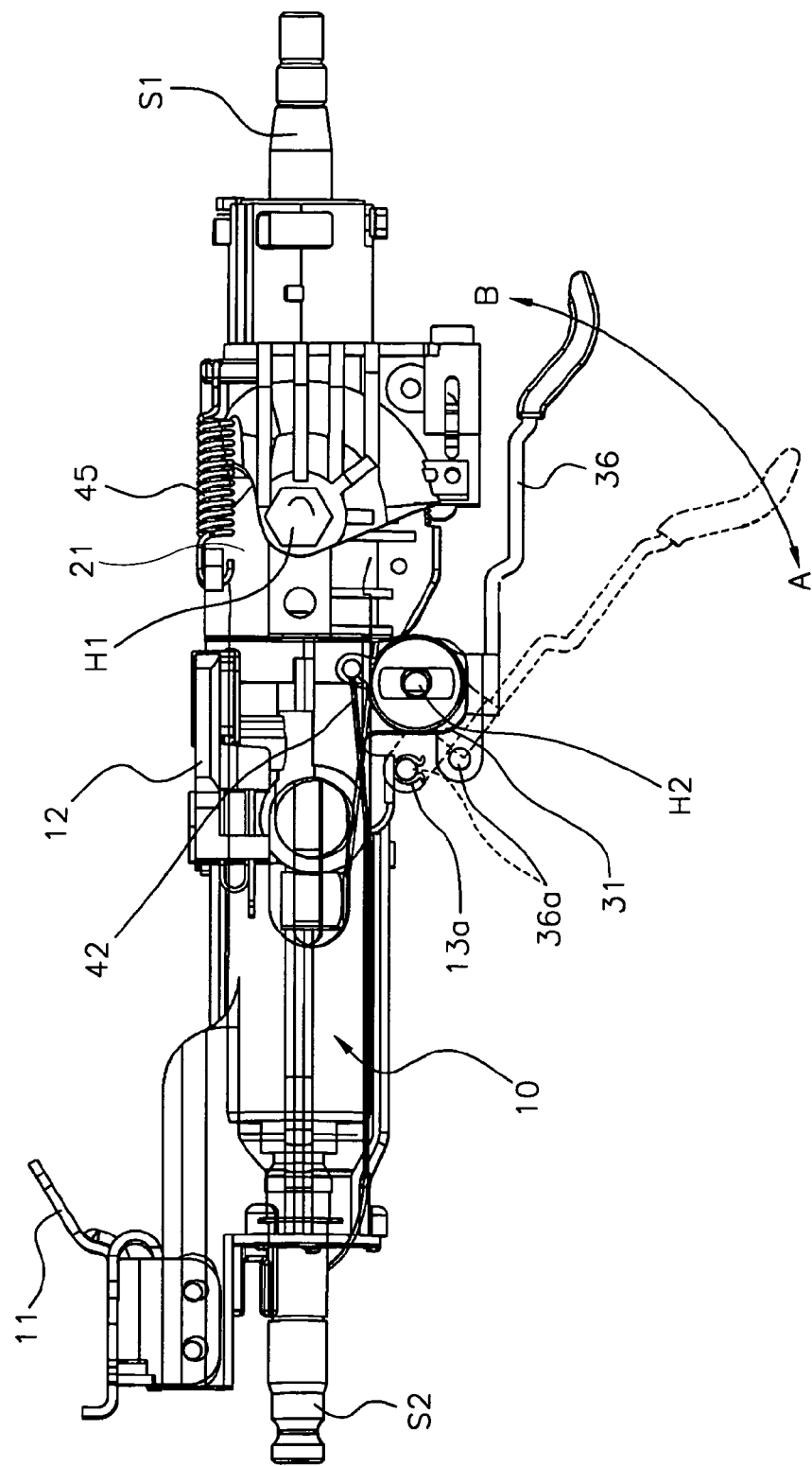
FIG. 1 is a schematic diagram for illustrating a tilt-telescopic apparatus for a steering system according to an embodiment of the present invention.
Figure 2:
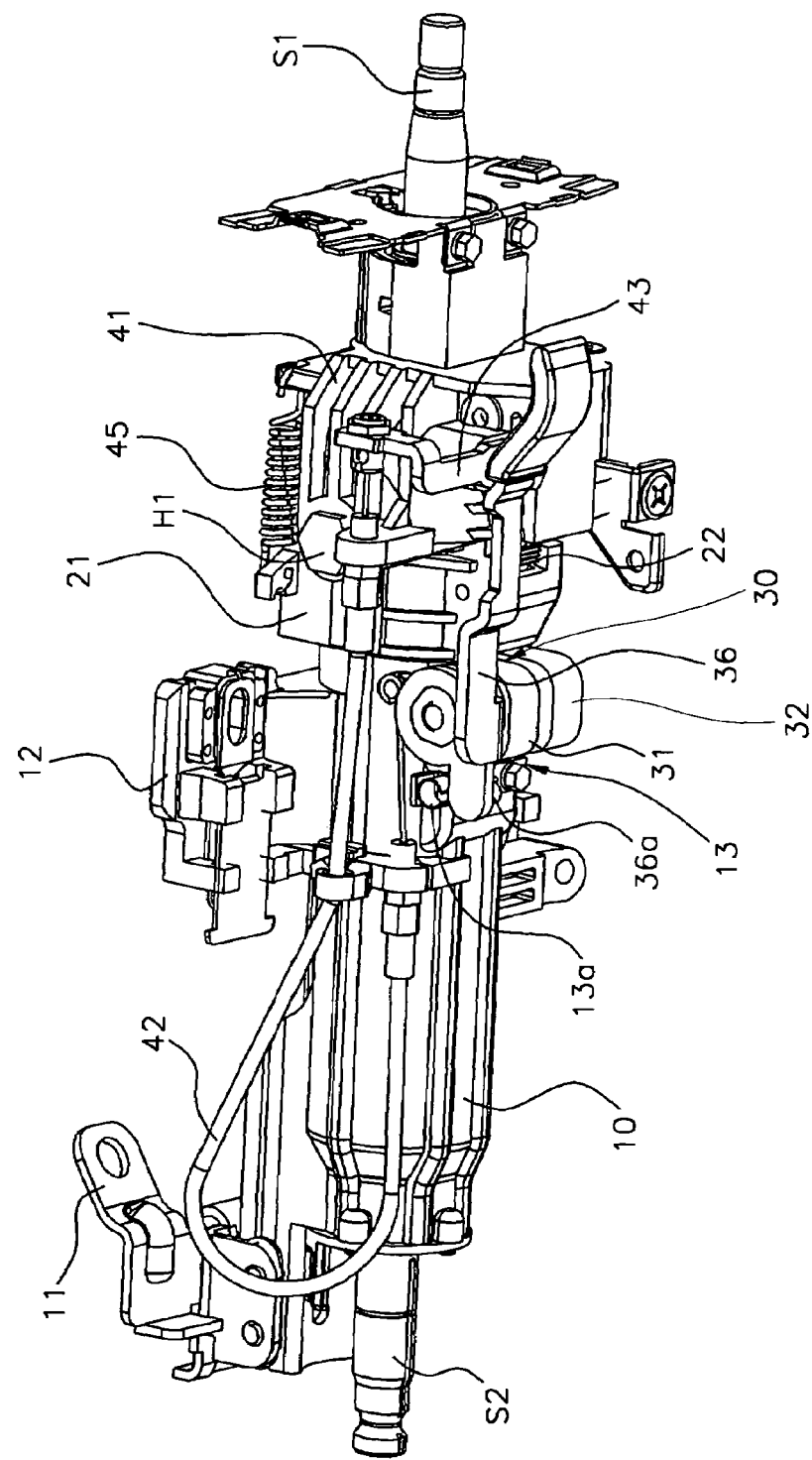
FIG. 2 is a perspective view as seen from a lower direction according to an embodiment of the present invention.
Figure 3:
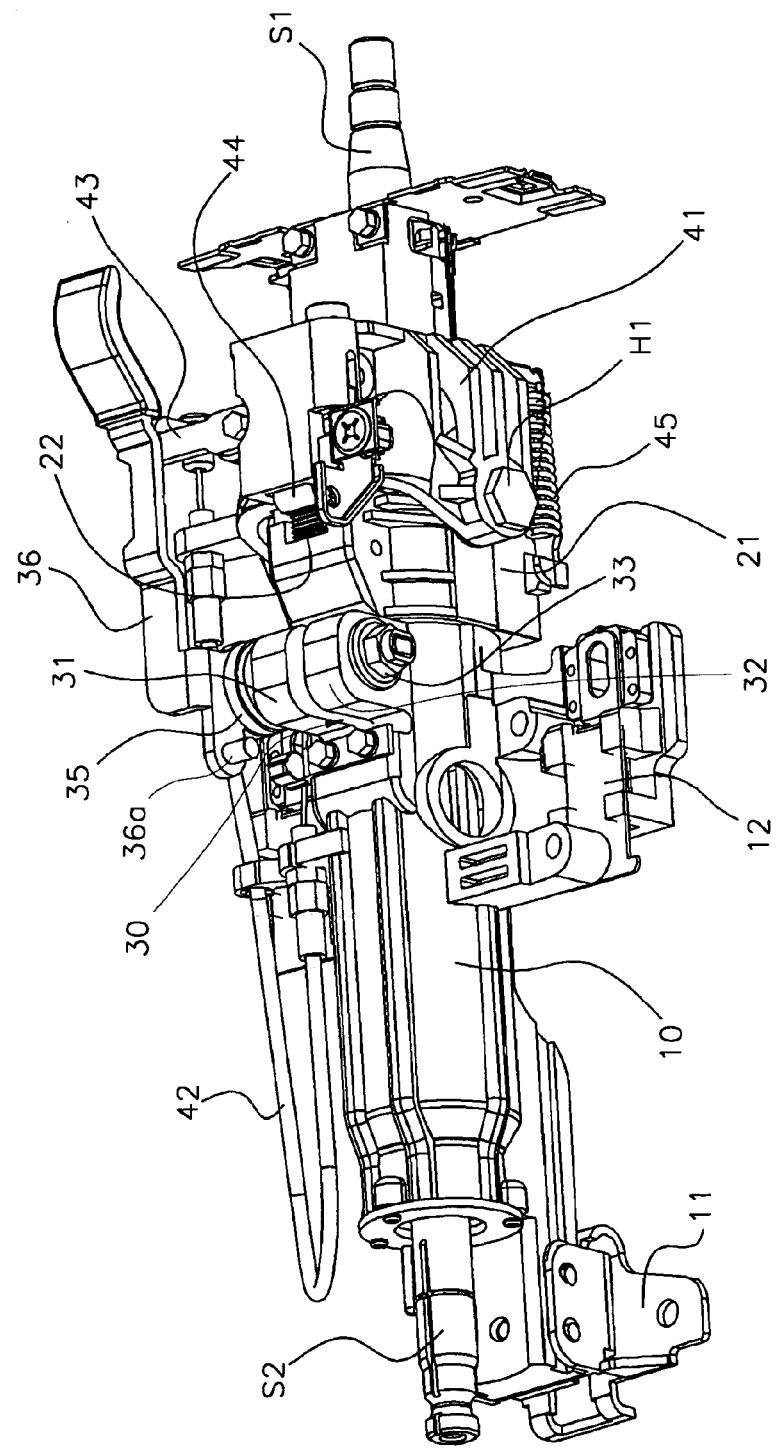
FIG. 3 is a perspective view of FIG. 2 seen from the other direction.
Figure 4:
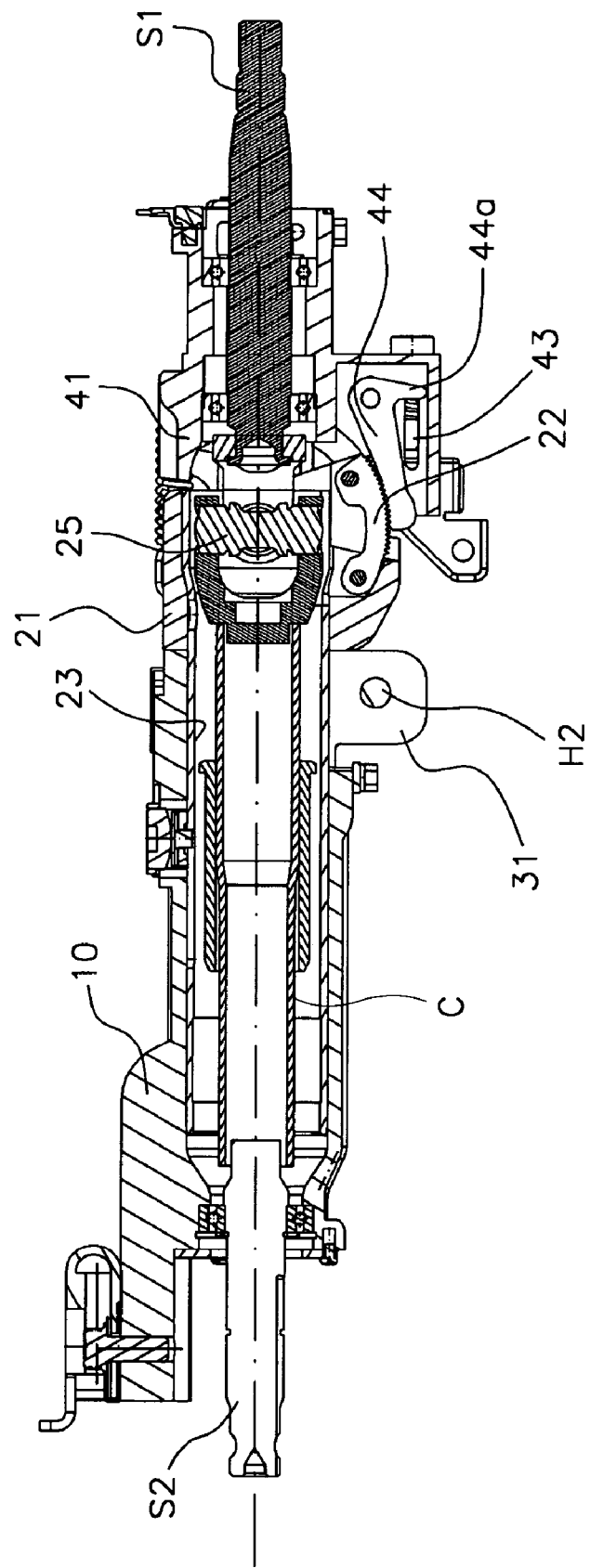
FIG. 4 is a longitudinal cross-sectional view of FIG. 1.

The preferred embodiment of the present invention will now be described in detail with reference to the annexed drawings, where the present embodiment is not limiting the scope of the present invention but is given only as an illustrative purpose.

As illustrated in FIGS. 1 to 4, the tilt-telescopic apparatus for a steering system includes a main housing (10), an inner pipe (23) longitudinally movable in a main housing (10), a column housing (21) coupled to a distal end of the inner pipe (23) and an upper housing (41) rotatably hinged via a hinge axle (H1) to a distal end of the column housing (21).

The main housing (10) is formed with a lower bracket (11) and an upper bracket (12) each mounted to a body of a vehicle at a predetermined space therebetween.

The upper housing (41) is mounted with a first steering shaft (S1) connected to a steering wheel (not described), and the main housing (10) is installed with a second steering shaft (S2) connected to a steering gear (not shown).

The first and second steering shafts (S1, S2) are interconnected by a connecting tube (C), and the connecting tube (C) and the first steering shaft (S1) are flexibly coupled by a joint connector (25).

For example, the first and second steering shaft (S1, S2) and the connecting tube (C) can be mutually connected by the known spline coupling, serration, or by a pin sliding insertion method.

A first spring (45) is formed between the column housing (21) and the upper housing (41) such that the column housing (21) and the upper housing (41) can be rotated with resilience from the first spring (45) via the hinge axle (H1).

Figure 5:
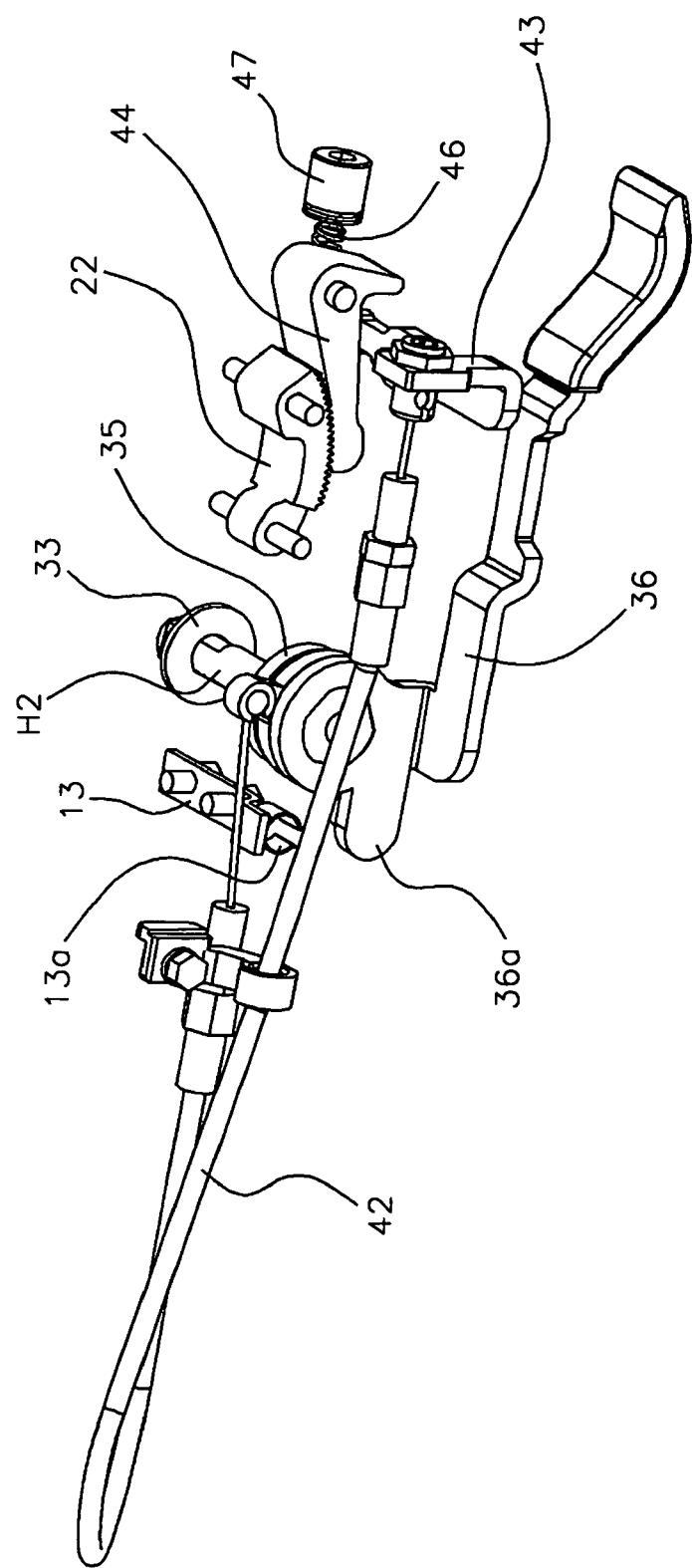
FIG. 5 is a perspective view of the principal elements of, for example, a manipulating lever, cable, tilt lever, fixation gear and stopper lever for illustrating a connected relation thereamong.
Figure 6:
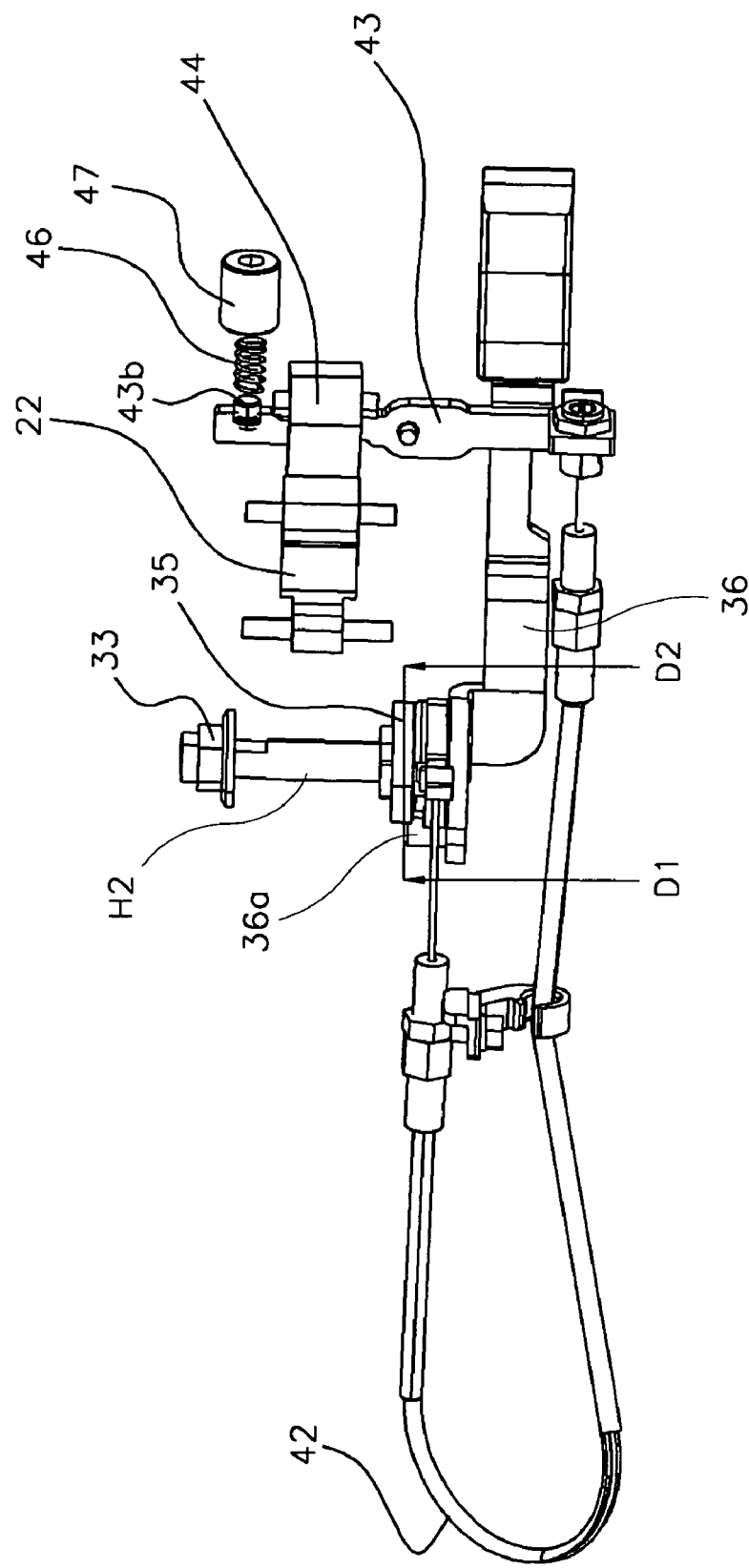
FIG. 6 is a plan view of FIG. 5.

Furthermore, the present invention includes telescopic restraining means, a manipulating lever (36), a cable (42), a tilt lever (43), a fixation gear (22) and tilt restraining means as shown in FIGS. 5 and 6.

The telescopic restraining means includes a cut-away part (30) formed at a distal end of the main housing (10), a pair of buckling blocks (31, 32) each oppositely arranged at the distal end of the main housing (10) around the cut-away part (30) and circumferentially protruded with insertion holes formed therein, and a rotational support axis (H2) penetratively inserted into the insertion holes of the pair of buckling blocks (31, 32). The telescopic restraining is further formed with a support nut (33) coupled at one side of the support axis (H2), and a cam mechanism (35) coupled at the other side of the support axis (H2) relative to the support nut (33). The manipulating lever (36) is rotatably coupled around the cam mechanism (35).

As is shown in FIG. 7, on a surface where the cam mechanism (35) and the manipulating lever (36) mutually face, there are formed oppositely-meshing inclinations (35-1, 36-1).

The manipulating lever (36) is extensively formed at a distal end thereof with a jig protruder (36a) for restraining rotation of the manipulating lever (36). The main housing (10) is mounted at one surface thereof with an intermittently fixing member (13) having a resiliently fixing unit (13a) and opened at one side thereof for the jig protruder (36a) to be inserted and fixed therein.

The cable (42) having a predetermined amount of tensile strength is connected at one end thereof to the manipulating lever (36) and connected at the other end to the tilt lever (43). The tilt lever (43) is elongated by the cable (42) and rotated along with the cable (42) when the manipulating lever (36) is rotated. The tilt lever (43) connected to the other end of the cable (42) is rotatably mounted at the upper housing (41).

The fixation gear (22) is either mounted at an upper or a lower end of the column housing (21) (in the drawing, the gear is mounted at the lower end) and is longitudinally formed with teeth along with the semi-spherical curved surface.

The tilt restraining means includes a stopper lever (44) formed at one end thereof with teeth meshed with those of the fixation gear (22) and rotatably mounted at the upper housing (41) toward a crossing direction with the tilt lever (43) and formed at the other end thereof with a tilt releasing protruder (44a) contacting the tilt lever (43), and a second spring (46) resiliently supporting the tilt lever (43) at one end thereof toward the fixation gear (22) and supported at the other end thereof by the support member (47) coupled with the upper housing (41).

The operational merit of the present invention thus constructed will now be described in detail with reference to the annexed drawings.

In order to the conduct telescopic and tilt operation, the manipulating lever (36) is turned toward the 'A' direction indicated by an arrow (see FIG. 1). Then, the jig protruder (36a) of the manipulating lever (36) is fixedly inserted into the resiliently fixing unit (13a) of the intermittently fixing member (13) to transfer meshness between the cam mechanism (35) and the manipulating lever (36) of FIG. 7 to that of FIG. 8.

In other words, when the manipulating lever (36) is turned toward the 'A' direction indicated by the arrow (see FIG. 1), a valley of the inclination (35-1) at the cam mechanism (35) and a valley of the inclination (36-1) at the manipulating lever (36) are overlapped to release a pressed state of the buckling blocks (31, 32) by way of the cam mechanism (35), prompting the inner pipe (23) to be engaged in a movable state.

At the same time, the tilt lever (43) connected to the manipulating lever (36) via the cable (42) is rotated by the rotation of the manipulating lever (36) to push the tilt releasing protruder (44a) of the stopper lever (44) toward an opposite direction of the fixation gear (22). In this regard, the stopper lever (44) is rotated to an opposite direction of the fixation gear (22) to release the meshed coupling of teeth between the fixation gear (22) and the stopper lever (44), resulting in a restraint releasing state for vertically rotating the upper housing (41) relative to the column housing (21).

When a driver is handling a steering wheel (not shown) for telescopic manipulation, a force is applied toward the first and second steering shafts (S1, S2) to pull or push the steering wheel, the inner pipe (23) is pushed in or pulled out from the main housing (10), whereby a length from the second steering shaft (S2) to the steering wheel (hereinafter referred to as 'steering wheel depth') can be changed in accordance with the driver's desire.

Simultaneously, when the driver holds and vertically rotates the steering wheel for tilt manipulation, the upper housing (41) connected to the steering wheel via the first steering shaft (S1) is vertically rotated, such that a vertical angle of the steering wheel can be appropriately changed in accordance with the driver's desire.

When the vertical angle of the steering wheel and the depth of the steering wheel are established via the telescopic and tilt manipulations to rotate the manipulating lever (36) to a 'B' direction indicated by an arrow (see FIG. 1), the jig protruder (36a) at the manipulating lever (36) is detached from the resiliently fixing unit (13a) of the intermittently fixing member (13), and concurrently the meshed coupling between the cam mechanism (35) and the manipulating lever (36) is changed from that of FIG. 8 to that of FIG. 7.

In other words, when the manipulating lever (36) is turned to the 'B' direction indicated by the arrow (see FIG. 1), the crest of the inclination (35-1) at the cam mechanism (35) and crest of the inclination (36-1) at the manipulating lever (36) are correspondingly matched to prompt the cam mechanism (35) to apply pressure to the buckling blocks (31, 32), thereby restraining the inner pipe (23), as illustrated in FIG. 7.

Simultaneously, the tilt lever (43) connected to the manipulating lever (36) via the cable (42) is rotated by the rotation of the manipulating lever (36), allowing a distal end formed with the teeth of the stopper lever (44) to be pushed toward the fixation gear (22).

As a result, the stopper lever (44) is rotated toward the fixation gear (22) to prompt the teeth of the fixation gear (22) and stopper lever (44) to be meshed therebetween, thereby restraining the flexion of the upper housing (41) relative to the column housing (21).

Successively, when the resilience of the second spring is applied to the tilt lever (43) to press the tilt lever (43) toward the fixation gear (22), the teeth of the stopper lever (44) and the fixation gear (22) maintain the mutually-adjoined state.

The foregoing description of the preferred embodiment of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto, and their equivalents.

The above-mentioned present invention is so constructed as to allow the tilt restraining means and the telescopic restraining means to cooperate via one manipulating lever, and to conduct a tilt restraint, telescopic restraint, tilt restraint release, and telescopic restraint release.

As apparent from the foregoing, there is an advantage in the tilt-telescopic apparatus for a steering system thus described according to the embodiment of the present invention in that the tilt and telescopic operations can be simultaneously and conveniently performed by one simple manipulation.

There is another advantage in that the parts of the apparatus, including structural parts for transmitting power to the manipulating lever and the like that can be co-used can be unified, thus resulting in a simplified structure and reduction of manufacturing cost.

What is claimed is:

1. A tilt-telescopic apparatus for a steering system, the system including a main housing, an inner pipe longitudinally movable in the main housing, a column housing coupled to an end of the inner pipe and an upper housing rotatably hinged to an end of the column housing, comprising:
    a manipulating lever rotatably hinged to a lower side of the main housing;
    telescopic restraining means formed at an end of the main housing and tightened by rotation of the manipulating lever to restrain the inner pipe;
    a cable connected to one end of the manipulating lever;
    a tilt lever connected to the other end of the cable and rotatably mounted at the upper housing;
    a fixation gear mounted at an upper side or lower side of the column housing and longitudinally formed with teeth along a curvature;
    tilt restraining means including teeth meshed with the teeth of the fixation gear and rotating in cooperation with the tilt lever for separating the teeth in relation to the rotating direction by pushing the teeth toward the teeth of the fixation gear or pulling the teeth;
    a jig protruder formed at one end of the manipulating lever; and
    an intermittently fixing member mounted at one surface of the main housing corresponding to a rotation restraining position of the manipulating lever and formed with a resiliently fixing unit having an opening at one side thereof for the jig protruder to be fixedly inserted thereinto.

2. The apparatus as defined in claim 1, wherein the telescopic restraining means comprises:
    a cut-away part formed at the end of the main housing;
    a pair of buckling blocks each oppositely arranged at the end of the main housing around the cut-away part and circumferentially protruded with insertion holes formed therein;
    an inclination formed at one side of one of the buckling blocks;
    a rotational support axis penetratively inserted into the insertion holes of the pair of buckling blocks;
    a support nut coupled at one side of the support axis; and
    a cam mechanism coupled at the other side of the support axis and formed at one side thereof with an inclination corresponding to the inclination formed at one side of one of the buckling blocks and rotated by a manipulating lever.

3. The apparatus as defined in claim 1, wherein the tilt restraining means comprises:
    a stopper lever formed at one end thereof with teeth meshed with those of the fixation gear, rotatably mounted at the upper housing, and meshed to the tilt lever so as to be rotated in both directions by the tilt lever; and
    a spring resiliently supporting the tilt lever toward the fixation gear.

4. The apparatus as defined in claim 1 further comprising a spring mounted at a position opposite to the fixation gear between the column housing and the upper housing.

5. A tilt-telescopic apparatus for a steering system, the system including a main housing, an inner pipe longitudinally movable in the main housing, a column housing coupled to an end of the inner pipe and an upper housing rotatably hinged to an end of the column housing, comprising:
    a manipulating lever rotatably hinged to a lower side of the main housing;
    a telescopic restraining unit formed at an end of the main housing and tightened by rotation of the manipulating lever to restrain the inner pipe;
    a cable connected to one end of the manipulating lever;
    a tilt lever connected to the other end of the cable and rotatably mounted at the upper housing;
    a fixation gear mounted at an upper side or lower side of the column housing and longitudinally formed with teeth along a curvature;
    a tilt restraining unit including teeth meshed with the teeth of the fixation gear and rotating in cooperation with the tilt lever for separating the teeth in relation to the rotating direction by pushing the teeth toward the teeth of the fixation gear or pulling the teeth;
    a jig protruder formed at one end of the manipulating lever; and
    an intermittently fixing member mounted at one surface of the main housing corresponding to a rotation restraining position of the manipulating lever and formed with a resiliently fixing unit having an opening at one side thereof for the jig protruder to be fixedly inserted thereinto.

6. The apparatus as defined in claim 5, wherein the telescopic restraining unit comprises:
    a cut-away part formed at the end of the main housing;
    a pair of buckling blocks each oppositely arranged at the end of the main housing around the cut-away part and circumferentially protruded with insertion holes formed therein;
    an inclination formed at one side of one of the buckling blocks; a rotational support axis penetratively inserted into the insertion holes of the pair of buckling blocks;
    a support nut coupled at one side of the support axis; and
    a cam mechanism coupled at the other side of the support axis and formed at one side thereof with an inclination corresponding to the inclination formed at one side of one of the buckling blocks and rotated by a manipulating lever.

7. The apparatus as defined in claim 5, wherein the tilt restraining unit comprises:
    a stopper lever formed at one end thereof with teeth meshed with those of the fixation gear, rotatably mounted at the upper housing, and meshed to the tilt lever so as to be rotated in both directions by the tilt lever; and
    a spring resiliently supporting the tilt lever toward the fixation gear.

8. The apparatus as defined in claim 5 further comprising a spring mounted at a position opposite to the fixation gear between the column housing and the upper housing.

* * * * *